United States Patent
Alekseev

(10) Patent No.: US 9,810,103 B2
(45) Date of Patent: Nov. 7, 2017

(54) METHOD AND DEVICE FOR GENERATING ELECTRICAL ENERGY

(71) Applicant: LINDE AKTIENGESELLSCHAFT, Munich (DE)

(72) Inventor: Alexander Alekseev, Wolfratshausen (DE)

(73) Assignee: LINDE AKTIENGESELLSCHAFT, Munich (DE)

( * ) Notice: Subject to any disclaimer, the term of this patent is extended or adjusted under 35 U.S.C. 154(b) by 331 days.

(21) Appl. No.: 14/418,566

(22) PCT Filed: Aug. 1, 2013

(86) PCT No.: PCT/EP2013/002297
§ 371 (c)(1),
(2) Date: Jan. 30, 2015

(87) PCT Pub. No.: WO2014/019698
PCT Pub. Date: Feb. 6, 2014

(65) Prior Publication Data
US 2015/0226094 A1 Aug. 13, 2015

(30) Foreign Application Priority Data
Aug. 2, 2012 (EP) ..................... 12005616

(51) Int. Cl.
*F01K 25/00* (2006.01)
*F01K 25/08* (2006.01)
(Continued)

(52) U.S. Cl.
CPC .............. *F01K 25/08* (2013.01); *F01K 3/004* (2013.01); *F01K 7/16* (2013.01); *F01K 23/14* (2013.01);
(Continued)

(58) Field of Classification Search
CPC ...... F02C 6/14; F02C 6/16; F02C 3/20; F02C 3/22; F01K 25/08
See application file for complete search history.

(56) References Cited

U.S. PATENT DOCUMENTS 4,329,842 A 5/1982 Hoskinson
7,305,832 B2 12/2007 Fletcher et al.
(Continued)

OTHER PUBLICATIONS

International Search Report from PCT Application No. PCT/EP2013/002297 dated Apr. 7, 2014.

*Primary Examiner* — Pascal M Bui Pho
*Assistant Examiner* — Katheryn Malatek
(74) *Attorney, Agent, or Firm* — Millen White Zelano & Branigan, PC

(57) ABSTRACT

The invention relates to a method and a device for generating electrical energy in a combined system consisting of a power plant and an air handling system. The power plant comprises a first gas expansion unit connected to a generator. The air handling system comprises an air compression unit, a heat exchange system, and a fluid tank. In a first operating mode, feed air is compressed in the air compression unit and cooled in the heat exchange system. A storage fluid is generated from the compressed and cooled feed air and is stored as cryogenic fluid in fluid tank. In a second operating mode, cryogenic fluid is removed from fluid tank and is vaporized, or pseudo-vaporized, at superatmospheric pressure. The gaseous high pressure storage fluid generated is expanded in the gas expansion unit. Gaseous natural gas is introduced into the heat exchange system (21) to be liquefied.

9 Claims, 7 Drawing Sheets

(51) Int. Cl.
*F02C 6/16* (2006.01)
*F02C 3/20* (2006.01)
*F02C 6/14* (2006.01)
*F02C 3/22* (2006.01)
*F01K 3/00* (2006.01)
*F25J 1/00* (2006.01)
*F25J 1/02* (2006.01)
*F25J 3/04* (2006.01)
*F01K 7/16* (2006.01)
*F01K 23/14* (2006.01)
*F01K 23/18* (2006.01)

(52) U.S. Cl.
CPC ............... *F01K 23/18* (2013.01); *F02C 3/20* (2013.01); *F02C 3/22* (2013.01); *F02C 6/14* (2013.01); *F02C 6/16* (2013.01); *F25J 1/004* (2013.01); *F25J 1/0012* (2013.01); *F25J 1/0022* (2013.01); *F25J 1/0035* (2013.01); *F25J 1/0037* (2013.01); *F25J 1/0045* (2013.01); *F25J 1/0221* (2013.01); *F25J 1/0224* (2013.01); *F25J 1/0228* (2013.01); *F25J 1/0232* (2013.01); *F25J 1/0251* (2013.01); *F25J 3/0429* (2013.01); *F25J 3/04048* (2013.01); *F25J 3/04078* (2013.01); *F25J 3/04266* (2013.01); *F25J 3/04345* (2013.01); *F25J 3/04503* (2013.01); *F25J 3/04593* (2013.01); *F25J 2205/66* (2013.01); *F25J 2210/40* (2013.01); *F25J 2210/60* (2013.01); *F25J 2210/62* (2013.01); *F25J 2215/40* (2013.01); *F25J 2235/02* (2013.01); *F25J 2240/10* (2013.01); *F25J 2240/80* (2013.01); *F25J 2240/82* (2013.01); *F25J 2240/90* (2013.01); *F25J 2245/40* (2013.01); *F25J 2270/14* (2013.01)

(56) References Cited

U.S. PATENT DOCUMENTS

| | | | |
|---|---|---|---|
| 7,464,557 | B2 | 12/2008 | Vandor et al. |
| 7,821,158 | B2 | 10/2010 | Vandor |
| 8,020,404 | B2 | 9/2011 | Vandor |
| 8,020,406 | B2 | 9/2011 | Vandor et al. |
| 2003/0101728 | A1* | 6/2003 | Wakana ............... F02C 6/14 60/727 |
| 2005/0126176 | A1 | 6/2005 | Fletcher et al. |
| 2007/0186563 | A1 | 8/2007 | Vandor et al. |
| 2008/0060340 | A1 | 3/2008 | Fletcher et al. |
| 2009/0113928 | A1 | 5/2009 | Vandor et al. |
| 2009/0282840 | A1 | 11/2009 | Chen et al. |
| 2009/0293503 | A1 | 12/2009 | Vandor |
| 2010/0251763 | A1* | 10/2010 | Audun ............... B63B 25/16 62/614 |
| 2011/0000256 | A1 | 1/2011 | Vandor |

\* cited by examiner

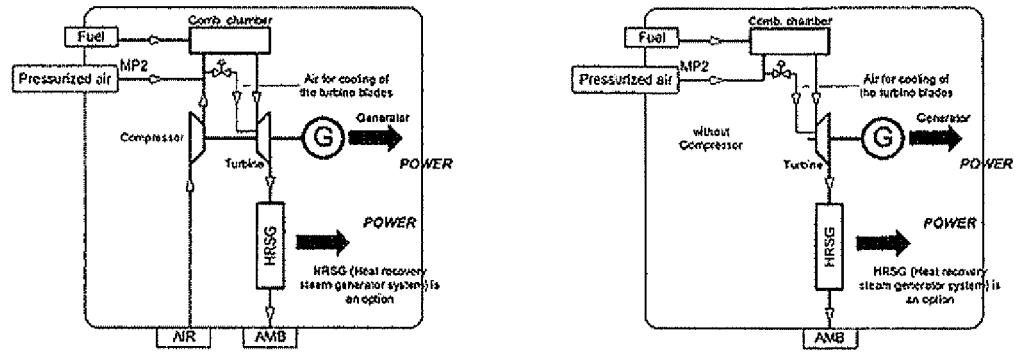
a)                        c)
FIG. 5
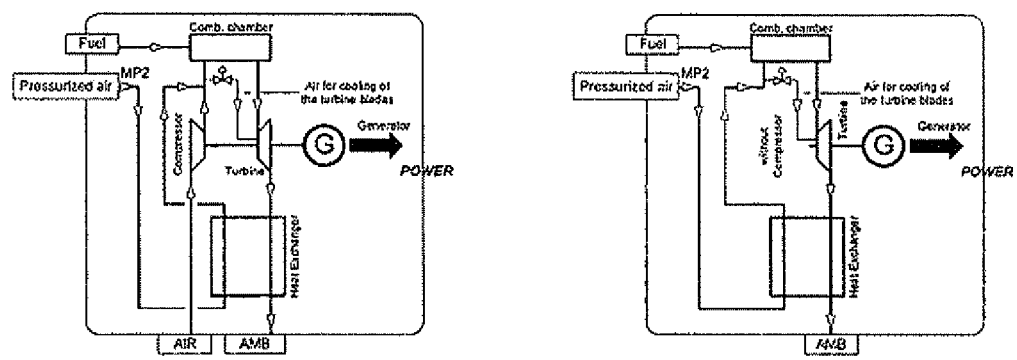
b)                        d)
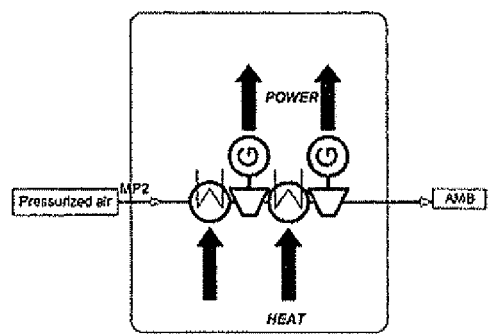
e)

METHOD AND DEVICE FOR GENERATING ELECTRICAL ENERGY

The invention relates to a method and an apparatus for generating electrical energy as per the preamble of patent claim 1 and also to a corresponding apparatus.

A "cryogenic liquid" is understood to be a liquid the boiling point of which is below ambient temperature and is for example 220 K or lower, in particular lower than 200 K.

The cryogenic liquid may be at subcritical pressure during "vaporization". However, if the cryogenic liquid is brought to a superatmospheric pressure, which is above the critical pressure, there is no real phase change ("vaporization"), but rather what is termed "pseudo-vaporization".

The "heat exchanger system" serves to cool feed air for the air treatment plant in indirect heat exchange with one or more cold streams. It may be formed from a single heat exchanger portion or a plurality of heat exchanger portions connected in parallel and/or in series, for example from one or more plate heat exchanger blocks.

Methods and apparatuses which use liquid air or liquid nitrogen for grid regulation and for providing control power in power grids are known. At times of cheap power, here the ambient air is liquefied in an air separation plant with an integrated liquefier or in a separate liquefaction plant, and is stored in a liquid tank in the form of a cryogenic store.

At times of peak load, the liquefied air is taken from the store, its pressure is raised in a pump and then it is warmed to about ambient temperature or higher. This hot high-pressure air is then expanded to ambient pressure in an expansion unit consisting of a turbine or a plurality of turbines with intermediate heating. The mechanical energy generated in the turbine unit is converted to electrical energy in a generator and is fed into the electrical grid as particularly valuable energy. Systems of this type are described in WO 2007096656 and in DE 3139567 A1.

The invention is based on the object of improving a system of this type in terms of its economic viability and in particular of making a relatively simple design in terms of apparatus possible.

This object is achieved by the characterizing features of patent claim 1. According to the invention, during the second operating mode, the cryogenic liquid is therefore brought into indirect heat exchange in the heat exchanger system with natural gas, which is liquefied or pseudo-liquefied under pressure in the process and is then obtained at a low pressure as a liquid. Refrigeration stored in the cryogenic liquid is therefore transferred to the natural gas and thereby utilized beneficially in contrast to the otherwise conventional (pseudo-) vaporization against a heat transfer medium such as atmospheric air or hot (water) vapor. The number of hardware components, such as heat exchangers, turbines and/or compressors, is thus reduced; the costs for the liquid air storage plant as a whole are reduced and the economic viability of this application is increased.

The natural gas liquefaction is carried out here in the heat exchanger system of the air treatment plant, which is present in any case for the cooling of the feed air in the first operating mode. Depending on the requirements of the specific air treatment plant, it is possible here for the natural gas to be brought directly into countercurrent with the (pseudo-) vaporizing storage liquid, or a refrigeration transfer medium circuit is used within the heat exchanger system, the natural gas flowing only through one or more common heat exchanger blocks with the refrigeration transfer medium. Refrigeration transfer medium systems of this type are known from air separation methods, in which the refrigeration is transferred from liquefied natural gas (LNG) to process streams of the air separation; these can be transferred correspondingly to the present application.

Within the context of the invention, mechanical energy is generated from the high-pressure storage fluid in the second operating mode by either the storage fluid itself or a fluid derived therefrom being expanded in the gas expansion unit so as to perform work. The fluid derived therefrom may be formed for example by a mixture of the storage fluid with one or more other fluids, or by a reaction product of the storage fluid with one or more other substances. The latter may be formed for example by combustion exhaust gas if the storage fluid contains oxygen and is used for the combustion of a fuel.

Before it is introduced into the heat exchanger system, the natural gas stream to be liquefied is brought in particular to a suitable high pressure of, for example, 20 to 200 bar, in particular 40 to 80 bar.

Conversely, in the first operating mode, a stream of liquefied natural gas is preferably introduced into the heat exchanger system, where it is vaporized or pseudo-vaporized.

As a result, the refrigeration transferred to the natural gas in the second operating mode can be recycled in the process itself. In the first operating mode, the liquefied natural gas can be introduced preferably entirely or in part into a storage apparatus (liquid natural gas tank), and in the second operating mode can be taken therefrom again.

In principle, the air compression unit can be switched off in the second operating mode; in this case, heat for the (pseudo-) vaporization of the cryogenic liquid is supplied exclusively by the natural gas to be liquefied. In many cases, it may be beneficial, however, if feed air is compressed in the air compression unit and cooled in the heat exchanger system in the second operating mode, too. Although it appears at first glance to be disadvantageous to continue to operate the air compression unit in the second operating mode, in which the energy price is high, it has been found within the context of the invention that surprisingly major operational advantages are associated therewith, because the air compression unit does not have to be switched off and on when switching over between the operating modes, but instead continues to operate continuously. Moreover, the quantity of compressed feed air can be obtained as high-pressure gas and electrical energy can additionally be obtained therefrom.

In a first variant of the method according to the invention, in the second operating mode at least part of the generation of electrical energy from the gaseous high-pressure storage fluid is performed in the gas turbine expander of a gas turbine system of a gas turbine power plant, the storage fluid being fed to the gas turbine system downstream of the vaporization. The gas turbine system is then part of the gas expansion unit within the meaning of patent claim 1. This use of the gas turbine system itself for obtaining energy from the high-pressure storage fluid is described in more detail in patent claims 5 and 6 and in the prior German patent application 102011121011 and the patent applications corresponding thereto.

A "gas turbine system" has a gas turbine (gas turbine expander) and a combustion chamber. In the gas turbine, hot gases from the combustion chamber are expanded so as to perform work. The gas turbine system may also have a gas turbine compressor driven by the gas turbine. Some of the mechanical energy generated in the gas turbine is commonly used to drive the gas turbine compressor. More of the mechanical energy is regularly converted in a generator to generate electrical energy.

In this variant, at least part of the generation of mechanical energy from the gaseous high-pressure storage fluid is performed in the gas turbine system of the power plant, that is to say in an apparatus present in any case in the power plant for converting pressure energy into mechanical drive energy. Within the context of the invention, an additional separate system for the work-performing expansion of the high-pressure storage fluid may be of less complex design or may be dispensed with entirely. In the simplest case, it is possible in the invention for the entire generation of mechanical energy from the gaseous high-pressure storage fluid to be performed in the gas turbine system. The high-pressure storage fluid is then fed to the gas turbine system, for example at the pressure at which it is (pseudo-) vaporized.

In a second variant, the gas expansion unit has a hot-gas turbine system having at least one heater and a hot-gas turbine. The generation of electrical energy from the gaseous high-pressure storage fluid is carried out here at least partially as work-performing expansion in a hot-gas turbine system which has at least one heater and a hot-gas turbine. Here, the generation of energy from the high-pressure storage fluid takes place outside the gas turbine system.

The "hot-gas turbine system" may be formed with a single stage with a heater and a single-stage turbine. Alternatively, it may have a plurality of turbine stages, preferably with intermediate heating. It is expedient in any case to provide a further heater downstream of the last stage of the hot-gas turbine system. The hot-gas turbine system is preferably coupled to one or more generators for generating electrical energy.

A "heater" is understood here to be a system for the indirect heat exchange between a heating fluid and the gaseous storage fluid. It is thus possible to transfer residual heat or waste heat to the storage fluid and to use this heat for generating energy in the hot-gas turbine system.

The two variants may also be combined by the gas expansion unit having one or more hot-gas turbines as well as one or more gas turbine systems. The gaseous high-pressure storage fluid is then expanded in two steps, the first step being carried out as a work-performing expansion in the hot-gas turbine system and the second step being carried out in the gas turbine system, the gaseous high-pressure storage fluid being fed to the hot-gas turbine system, where it is expanded to an intermediate pressure, and a gaseous intermediate-pressure storage fluid being removed from the hot-gas turbine system and finally being fed to the gas turbine system.

The air treatment plant, in which the cryogenic liquid is generated in the first operating mode, can be in the form of a cryogenic air separation plant or of an air liquefaction plant.

A "cryogenic air separation plant" is charged with atmospheric air and has a distillation column system for separating atmospheric air into its physical components, in particular into nitrogen and oxygen. To this end, the feed air is firstly cooled close to its dew point and is then introduced into the distillation column system.

Methods and apparatuses for the cryogenic separation of air are known for example from Hausen/Linde, Tieftemperaturtechnik, 2nd Edition, 1985, Chapter 4 (pages 281 to 337).

The distillation column system of the invention can be in the form of a one-column system for nitrogen-oxygen separation, in the form of a two-column system (for example in the form of a conventional Linde double column system) or else in the form of a three-column system or multi-column system. In addition to the columns for nitrogen-oxygen separation, it can have further apparatuses for the recovery of high-purity products and/or other air components, in particular noble gases, for example argon recovery and/or krypton-xenon recovery.

An "air liquefaction plant" does not contain any distillation column part. Otherwise, the structure thereof corresponds to that of a cryogenic air separation plant, with the delivery of a liquid product. It goes without saying that liquid air can also be generated as a byproduct in a cryogenic air separation plant.

The cryogenic liquid can be formed by liquefied air and/or liquid nitrogen, or in general terms by a fluid which contains less oxygen than the atmospheric air. It is also possible for a combination of two or more storage fluids of identical or differing composition from the same air treatment plant or from a plurality of air treatment plants to be used within the context of the invention.

"Nitrogen" is understood here to be both pure or substantially pure nitrogen and a mixture of air gases, the nitrogen content of which is higher than that of the atmospheric air. By way of example, the liquid nitrogen has a nitrogen content of at least 90%, preferably at least 99% (all percentages relate here and hereinbelow to the molar quantity, unless specified otherwise).

The invention also relates to an apparatus for generating energy as per patent claim 9. A "control device" is to be understood here to be an apparatus which at least automatically controls the system during the first operating mode and during the second operating mode.

It is preferably capable of automatically carrying out the transition from the first operating mode to the second operating mode, and vice versa. The apparatus according to the invention may be complemented by apparatus features which correspond to the features of the dependent method claims.

BRIEF DESCRIPTION OF DRAWINGS

The invention and further details of the invention will be explained in more detail hereinbelow with reference to exemplary embodiments shown schematically in the drawings, in which:

FIGS. 5a-5e—Shows possible embodiments of the gas expansion unit.

Figure 1A:
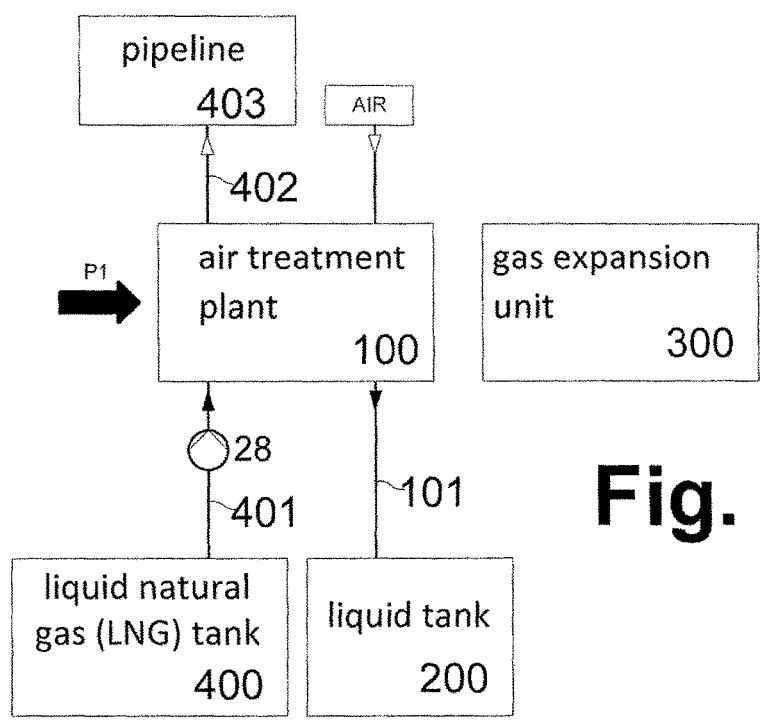
FIG. 1A—Shows the basic principle of a first variant of the invention, in the first operating mode.
Figure 1B:
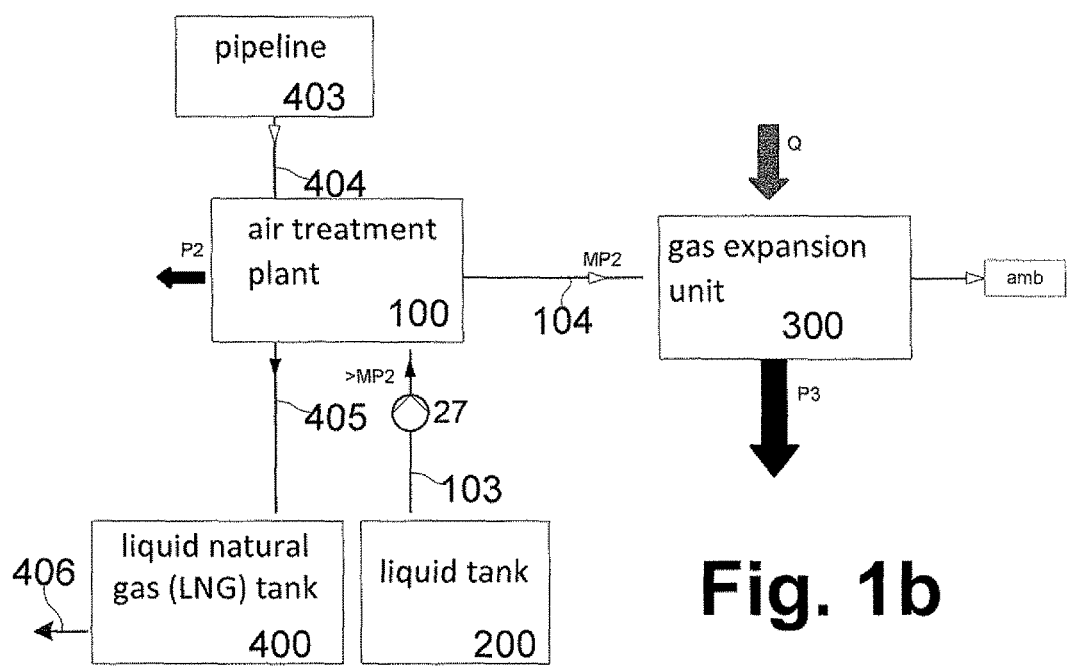
FIG. 1B—Shows the basic principle of a first variant of the invention, in the second operating mode.

The overall plant in FIGS. 1a and 1b consists of three units: an air treatment plant 100, a liquid tank 200 and a gas expansion unit 300.

FIG. 1a shows the first operating mode (cheap power phase—generally at night). Here, atmospheric air (AIR) is introduced as feed air into the air treatment plant 100. A cryogenic liquid 101, which is formed for example as liquid air, is produced in the air treatment plant. The air treatment plant is operated as a liquefier (in particular as an air liquefier). The cryogenic liquid 101 is introduced into the liquid tank 200, which is operated at a low pressure LP of less than 2 bar. The energy consumption of the air treatment plant in the first operating mode is denoted as P1.

Liquefied natural gas (LNG) is stored in a liquid natural gas tank 400 at low pressure (<2 bar). Natural gas 401 liquefied in the first operating mode is taken from this tank 400, is brought to a high pressure of approximately 50 bar in a pump 28 and is vaporized or pseudo-vaporized in the air treatment plant 100. Here, the vaporization refrigeration is utilized for generating the cryogenic liquid 101. The (pseudo-) vaporized natural gas is fed to one or more natural gas consumers, for example via a pipeline system 403.

FIG. 1b shows the second operating mode (peak power phase—generally during the day). The cryogenic liquid 103 (for example liquid air) is removed from the liquid tank 200, brought to an elevated pressure of somewhat greater than MP2 (MP2 is greater than 12 bar, for example approximately 20 bar) in a pump 27, vaporized in the air treatment plant and warmed to approximately ambient temperature and drawn off as a gaseous high-pressure storage fluid 104.

The vaporized high-pressure storage fluid 104 is conducted at the pressure MP2 to the gas expansion unit 300. The power P3 which is available at the gas expansion unit 300 in the second operating mode is for example 20 to 70%, preferably 40 to 60%, of the power P1 in the first operating mode. In addition, power P2 becomes free through work-performing expansion in the air treatment plant (see FIG. 2b).

The heat required for the vaporization is supplied according to the invention by gaseous natural gas 404. It comes from the pipeline system 403, for example. It is introduced into the air treatment plant 100 at a pressure of approximately 50 bar, takes up the majority of the vaporization refrigeration from the cryogenic liquid 103 and is pseudo-liquefied in the process. The liquefied natural gas 405 is expanded to a low pressure and then introduced in the liquid state into the liquid natural gas tank 400. A part 406 can be drawn off and utilized for other purposes.

The production of the cryogenic liquid and the LNG vaporization on the one hand and the vaporization of the cryogenic liquid and the natural gas liquefaction on the other hand are preferably carried out in the same process units. The same apparatuses can therefore be used in the first and second operating mode. This gives rise to a relatively low complexity in terms of apparatus.

A liquefaction phase (continuous operation in the first operating mode) and a vaporization phase (continuous operation in the second operating mode) can each last for one to ten hours. Over the course of a day, one or more vaporization and respectively liquefaction phases can be carried out. Depending on demand, the air treatment plant can be switched off in the period of time of transition between two such respective phases.

Figure 2A:
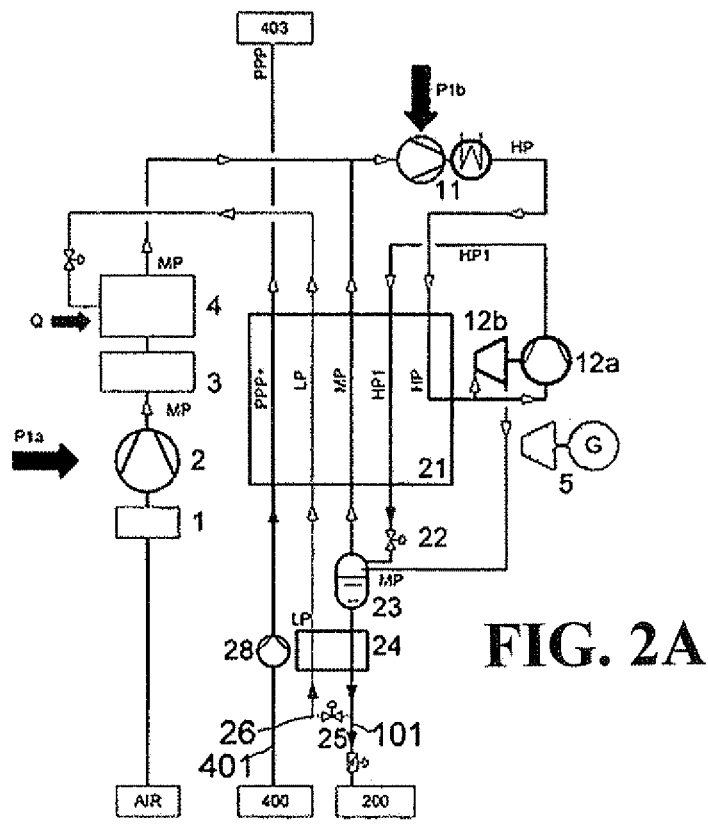
FIG. 2A—Shows a detailed illustration of the embodiment of an air treatment plant which can be used in this variant.
Figure 2B:
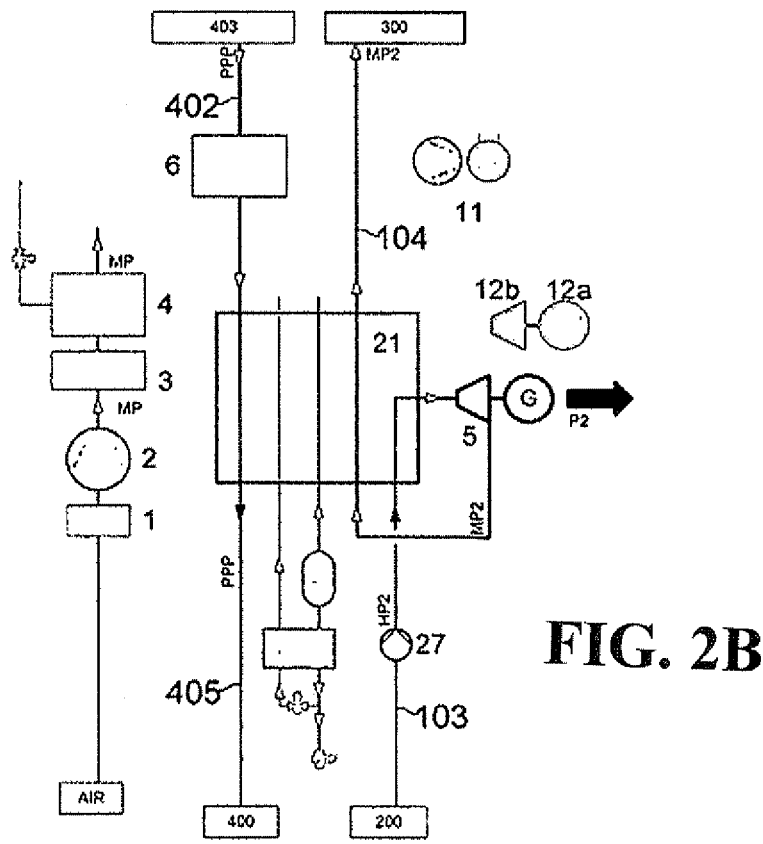
FIG. 2B—Shows another detailed illustration of the embodiment of an air treatment plant which can be used in this variant.

FIGS. 2a and 2b show a possible design of the air treatment plant 100 shown in FIG. 1, which here is in the form of an air liquefier.

FIG. 2a shows in turn the first operating mode (the liquefaction phase). Here, ambient air (AIR) is sucked in by an air compression unit 2 and compressed to a pressure MP (4 to 8 bar, in particular 5 to 8 bar), cooled in a pre-cooling device 3 and dried in a molecular sieve adsorber station 4 and purified of contaminants such as $CO_2$ and hydrocarbons. The compressed and purified air is conducted to a separate compressor, the circuit compressor 11, where it is compressed from the pressure MP initially to a higher pressure HP of 20 to 40 bar, is cooled in an aftercooler to approximately ambient temperature and is then cooled at HP in a heat exchanger system 21 to a first intermediate temperature of 140 to 180 K. The air is split at the first intermediate temperature into a first partial stream and a second partial stream.

The first partial stream is expanded to the pressure MP so as to perform work in a turbine 12b. The first partial stream of the feed air which has been expanded so as to perform work is introduced into a phase separating device (separator) 23, in order, if appropriate, to separate off minor liquid proportions. The gaseous fraction from the phase separating device 23 is conducted through the heat exchanger system 21, where it is warmed, and is guided together with the air from the molecular sieve adsorber station 4 to the suction pipe of the circuit compressor 11, and thereby forms an air circuit.

The second partial stream is post-compressed to a still higher pressure HP1 (for example 40 to 80 bar) in a cold compressor 12a. The cold compressor 12a is driven by the turbine 12b via a common shaft. The outlet temperature of the cold compressor 12a is approximately the same as the ambient temperature. At the pressure HP1, the second partial stream is fed back to the hot end of the heat exchanger system 21, cooled and pseudo-liquefied in the heat exchanger system 21, expanded to the pressure MP in a throttle valve and finally fed in an at least partially liquid state into the phase separating device 23. The liquid from the phase separating device 23 is subcooled in a subcooler 24 and conducted for the most part (101) as a cryogenic liquid into the liquid tank 200. For the subcooling, use is made of a partial quantity 26 of liquid air, which is removed after the subcooling 24, is expanded in a throttle valve 25 to the pressure LP and is conducted through the heat exchanger system 21. This partial quantity can also be used as regenerating gas for the molecular sieve adsorber station 4. The regenerating gas is warmed by steam, an electric heater or natural gas firing (quantity of heat Q). Alternatively, the molecular sieve adsorber station 4 is not regenerated at all during the first operating mode, but rather merely in the second operating mode. If the continuous operation in the first operating mode lasts for less than approximately 6 hours, this is readily possible. The molecular sieve adsorber station is then not switched over within an operating mode; it can then also be realized by means of a single adsorber container or by means of a plurality of containers which are operated in parallel.

Liquefied natural gas 401 is taken from the liquid natural gas tank 400, compressed to the required pressure PPP of approximately 50 bar in the pump 28 and conducted through the heat exchanger system 21, and (pseudo-) vaporized in the process. After warming, it is fed into the natural gas grid 403.

In the first operating mode, energy P1=P1a+P1b is supplied, in the form of the drive powers P1a for the air compression unit and P1b for the circuit compressor, and so too if appropriate is the quantity of heat Q for heating the regenerating gas. No energy is removed (except via the aftercoolers of the compressors), but instead energy is stored in the form of the cryogenic liquid air in the liquid tank 200.

The second operating mode will now be described with reference to FIG. 2b. Here, the turbine 12b, the cold compressor 12a, the circuit compressor 11, the air compression unit 2 and the Joule-Thomson stage (throttle valves, separator 23 and subcooler 24) are switched off.

Liquid air (LAIR) 103 is removed from the liquid tank 200, is brought to the required pressure HP2 of for example 50 to 80 bar, preferably 50 to 65 bar, in a pump 27, and is introduced into the heat exchanger system 21. After warming to a second intermediate temperature of, for example, 120 to 200 K, preferably 130 to 180 K, the high-pressure air is expanded to the pressure MP2 so as to perform work in a generator turbine 5 and finally conducted as a gaseous high-pressure storage fluid 104 to the gas expansion unit 300.

In countercurrent to the (pseudo-) vaporizing air 103, natural gas 402 at a pressure PPP (approximately 50 bar) from the pipeline system 403 is pseudo-liquefied in the heat exchanger system 21. Before it enters the heat exchanger system 21, the natural gas is preferably purified in a drying and purifying unit 6. The liquefied natural gas 405 expanded to a low pressure is introduced into the liquid natural gas tank 400.

In the second operating mode, no drive energy whatsoever is supplied to the air compression unit (the energy for driving liquid pumps is negligibly low and is therefore not taken into consideration here).

As an alternative to the illustration in FIG. 2b, the intermediate expansion in the generator turbine 5 can be dispensed with. The pressure downstream of the pump 27 is then merely MP2 (plus line losses).

If the molecular sieve adsorber station 4 is regenerated during the second operating mode, some of the gaseous high-pressure storage fluid 104, some of the gaseous high-pressure storage fluid heated in the gas expansion unit 300 or some of the exhaust gas of the gas expansion unit 300 can be used as regenerating gas (not shown in the drawing).

The heat exchanger system 21 of the air treatment plant is used both for the air liquefaction and natural gas vaporization (in the first operating mode) and for the air vaporization and natural gas liquefaction (in the second operating mode).

Figure 3A:
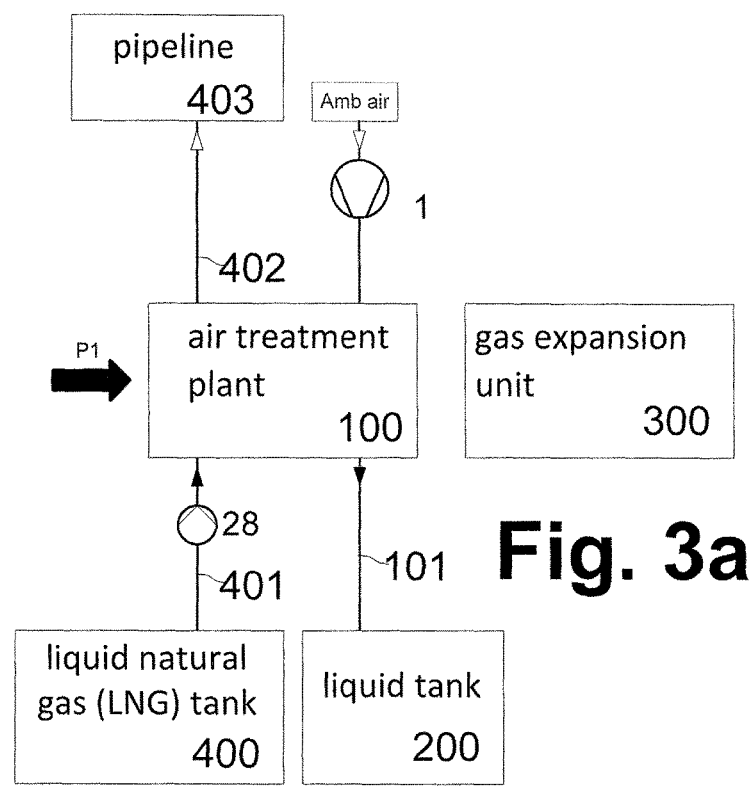
FIG. 3A—Shows a basic principle of a further variant of the invention.

In the first operating mode as shown in FIG. 3a, the second variant of the invention is operated like the first variant (FIG. 1a).

Figure 3B:
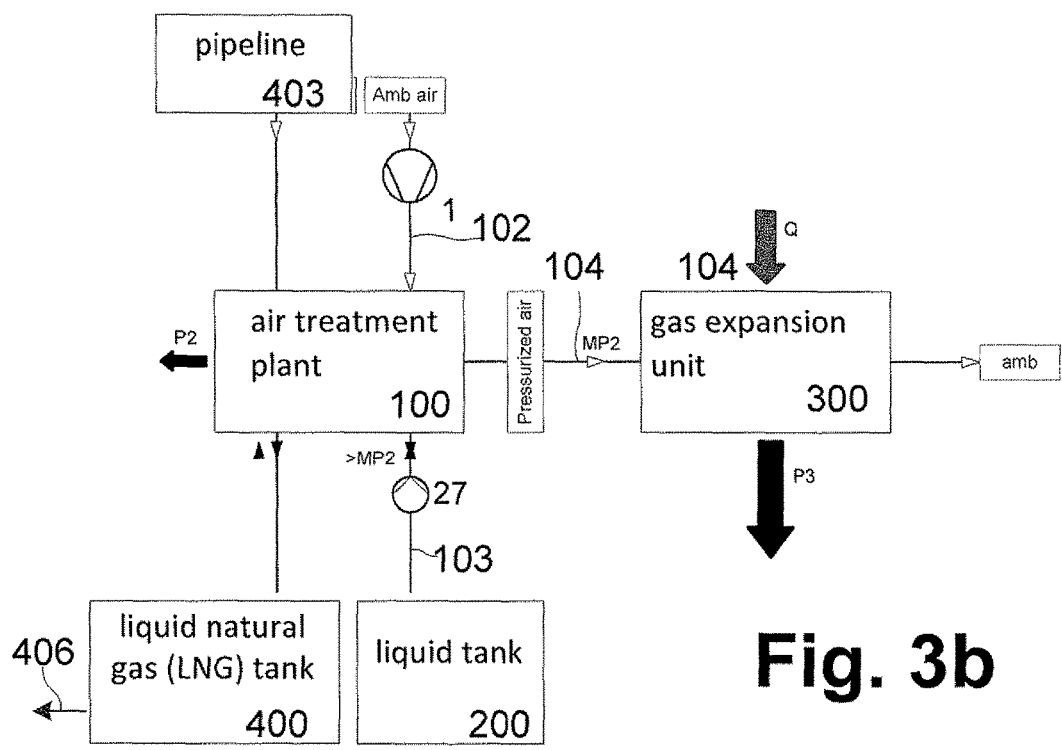
FIG. 3B—Shows another basic principle of a further variant of the invention.

FIG. 3b corresponds substantially to FIG. 1b, but here the air compression unit 1 continues to operate in the second operating mode, too.

Figure 4A:
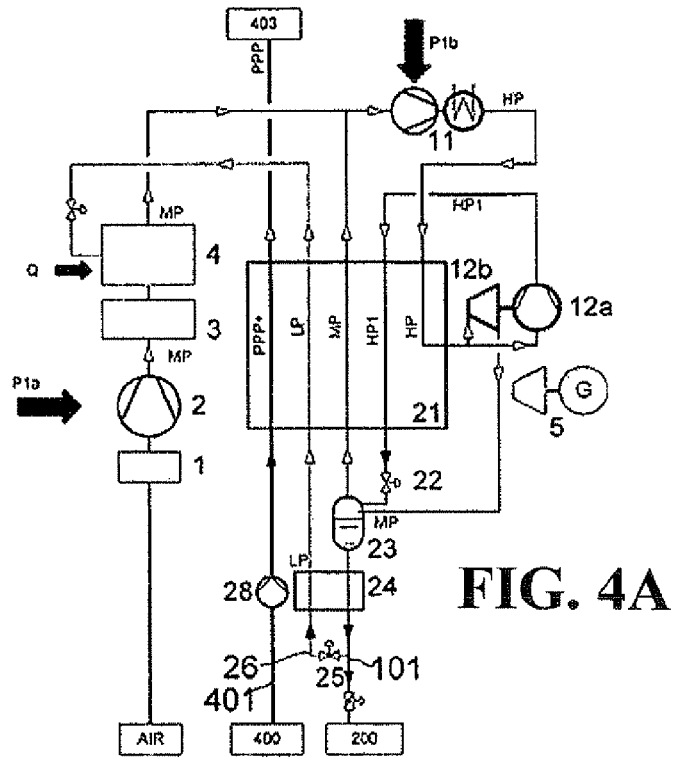
FIG. 4A—Shows a detailed illustration of the embodiment of an air treatment plant which can be used in the second variant.

FIG. 4a (first operating mode) is in turn identical to FIG. 2a.

Figure 4B:
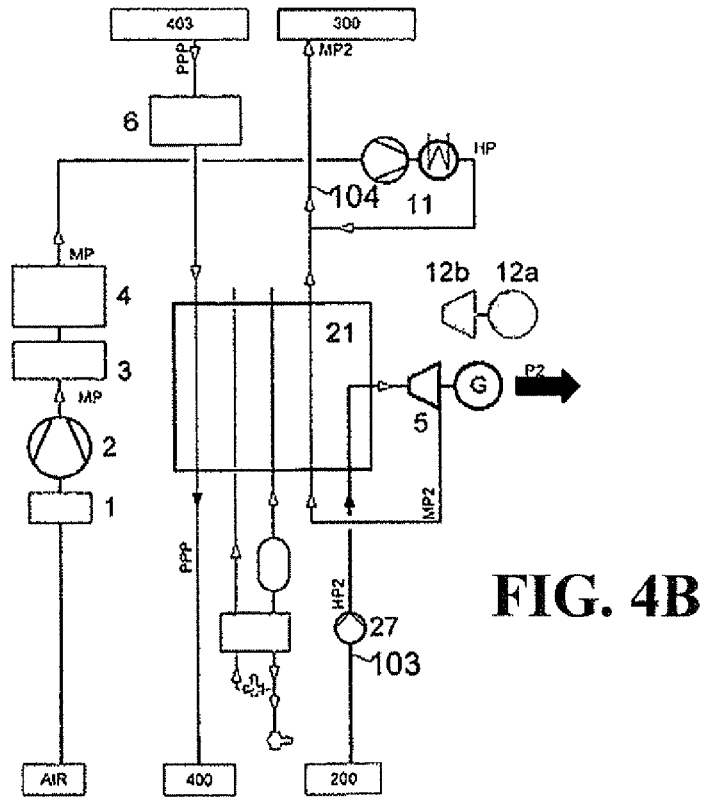
FIG. 4B—Shows another detailed illustration of the embodiment of an air treatment plant which can be used in the second variant.

FIG. 4b has the same components as FIG. 2b, but a differing interconnection. In the second operating mode of the second variant shown here, the air compression unit 2, the circuit compressor 11 and the turbine 5 continue to operate. In the circuit compressor 11, compressed air is generated from the compressed and purified air which comes from the molecular sieve adsorber station 4. This compressed air is mixed with the (pseudo-) vaporized compressed air from the heat exchanger system 21.

In this procedure, the air compression unit 2 also does not have to be switched off in the second operating mode, but instead operates permanently—both in the first and in the second operating modes. This is expedient in terms of operation. In addition, compressed air which contributes to generating energy in the gas expansion unit 300 is additionally generated.

A third variant corresponds largely to FIG. 4b. However, the air is not post-compressed in the hot compressor 11, but rather is cooled somewhat and then compressed in a cold compressor (cold compressor 12b from FIG. 2a/4a or a separate machine) and thereafter mixed with the vaporized high-pressure air and conducted to the gas expansion unit 300.

FIG. 5 shows possible embodiments of the gas expansion unit 300. In embodiments 5a and 5b, a conventional gas turbine is used for the expansion, the compressed air from the air treatment plant being introduced into the gas turbine upstream of the combustion chamber. The heat of the flue gas at the outlet can be used in a heat recovery steam generator (HRSG) (5a); alternatively, it is used in another way, for example to preheat the compressed air from the air treatment plant (5b).

In embodiments 5c and 5d, a converted gas turbine is used for the expansion; in this gas turbine, the compressor part is removed. The compressed air from the air treatment plant is introduced into the combustion chamber of the rest of the gas turbine. The heat of the flue gas can be used in a similar manner to the method with the gas turbine.

In embodiment 5e, the compressed air from the air treatment plant is firstly warmed and expanded in a plurality of successive turbines/turbine stages, the air being additionally warmed between the individual expansion stages. This represents an exemplary embodiment for a gas expansion unit having a hot-gas turbine system which has at least one heater and a hot-gas turbine—in this case, there are respectively two heaters and hot-gas turbines; alternatively, the hot-gas turbine system may also have more than two stages.

The embodiment variants 5a and 5b and also 5c and 5d may be combined with one another.

The invention claimed is:

1. A method for generating electrical energy in a system comprising a power plant and an air treatment plant, wherein the power plant has a gas expansion unit, which is connected to a generator for generating the electrical energy, and the air treatment plant has an air compression unit, a heat exchanger system and a liquid tank, said method comprising:
   in a first operating mode
      in the air treatment plant
         compressing a feed air in the air compression unit to form a compressed feed air, and cooling the compressed feed air in the heat exchanger system, to form a compressed and cooled feed air,
         producing a storage fluid from the compressed and cooled feed air, and
         storing the storage fluid as a cryogenic liquid in the liquid tank,
   and in a second operating mode
      removing said cryogenic liquid from the liquid tank and vaporizing or pseudo-vaporizing said cryogenic liquid at superatmospheric pressure to generate a gaseous high-pressure storage fluid, and expanding said gaseous high-pressure storage fluid in the gas expansion unit, and
   wherein, in the second operating mode, said method further comprises:
      introducing a gaseous natural gas into the heat exchanger system, where said gaseous natural gas is liquefied or pseudo-liquefied, and
      wherein the vaporizing or pseudo-vaporizing of said cryogenic liquid is carried out in the heat exchanger system.

2. The method as claimed in claim 1, wherein in said first operating mode, a stream of liquefied natural gas is introduced into said heat exchanger system, where said stream of liquefied natural gas is vaporized or pseudo-vaporized.

3. The method as claimed in claim 1, wherein said feed air is also compressed in said air compression unit in said second operating mode.

4. The method as claimed in claim 1, wherein said power plant further comprises a gas turbine system with a combustion chamber, a gas turbine expander, and a generator, and wherein in said second operating mode said gaseous high-pressure storage fluid is fed to said gas turbine system downstream of the vaporizing or pseudo-vaporizing of said cryogenic liquid in the heat exchanger system.

5. The method as claimed in claim 4, wherein said gas expansion unit comprises a hot-gas turbine system having at least one heater and a hot-gas turbine.

6. The method as claimed in claim 5, wherein said gaseous high-pressure storage fluid is expanded in a first step and a second step, said first step being carried out as a work-performing expansion in said hot-gas turbine system, and said second step being carried out in said gas turbine system, and wherein said gaseous high-pressure storage fluid is fed to said hot-gas turbine system where said gaseous high-pressure storage fluid is expanded to an intermediate pressure to produce a gaseous intermediate-pressure storage fluid, and said gaseous intermediate-pressure storage fluid is removed from said hot-gas turbine system and fed to said gas turbine system.

7. The method as claimed in claim 1, wherein said air treatment plant is a cryogenic air separation plant or an air liquefaction plant.

8. The method as claimed in claim 1, wherein said cryogenic liquid is liquefied air or liquid nitrogen.

9. An apparatus for generating electrical energy comprising a system comprising a power plant and an air treatment plant, wherein the power plant has a gas expansion unit, which is connected to a generator for generating the electrical energy, and
wherein the air treatment plant has
an air compression unit for compressing a feed air to form a compressed feed air,
a heat exchanger system for cooling the compressed feed air to form a cooled and compressed feed air,
means for introducing the compressed feed air into the heat exchanger system,
means for producing a storage fluid from the cooled and compressed feed air from the heat exchanger system,
a liquid tank for storing the storage fluid as a cryogenic liquid,
means for removing said cryogenic liquid from the liquid tank,
means for increasing the pressure of the cryogenic liquid removed from the liquid tank to form a cryogenic liquid at an elevated pressure, and
means for generating a gaseous high-pressure storage fluid by vaporizing or pseudo-vaporizing the cryogenic liquid at an elevated pressure,
said apparatus further comprising:
means for introducing the gaseous high-pressure storage fluid into the gas expansion unit, and
a control device and control elements for operating the system in a first and in a second operating mode, wherein
in the first operating mode
in the air treatment plant
the feed air is compressed in the air compression unit and cooled in the heat exchanger system,
the storage fluid produced from the cooled and compressed feed air contains less than 40 mol % of oxygen, and
the storage fluid produced from the cooled and compressed feed air is stored as the cryogenic liquid in the liquid tank,
and in the second operating mode
the cryogenic liquid is removed from the liquid tank and the removed cryogenic liquid is vaporized or pseudo-vaporized at superatmospheric pressure to generate the gaseous high-pressure storage fluid, and the gaseous high-pressure storage fluid is expanded in the gas expansion unit,
said apparatus further comprising:
means for introducing gaseous natural gas into the heat exchanger system, and
wherein in the second operating mode, the control device and the control elements operate to
introduce the gaseous natural gas into the heat exchanger system, where the gaseous natural gas is liquefied or pseudo-liquefied, and
the vaporizing or pseudo-vaporizing of the cryogenic liquid is carried out in the heat exchanger system.

* * * * *